United States Patent [19]

Alcock et al.

[11] Patent Number: 4,894,782

[45] Date of Patent: Jan. 16, 1990

[54] DIAGNOSTIC SYSTEM FOR DETERMINING ENGINE START BLEED STRAP FAILURE

[75] Inventors: Joseph F. Alcock, Palm Beach Gardens; Roger D. Tull, West Palm Beach, both of Fla.

[73] Assignee: United Technologies Corporation, Hartford, Conn.

[21] Appl. No.: 361,732

[22] Filed: Jun. 2, 1989

Related U.S. Application Data

[63] Continuation of Ser. No. 135,022, Dec. 18, 1987, abandoned.

[51] Int. Cl.⁴ .......................... G06F 15/20; F02C 9/18
[52] U.S. Cl. ........................ 364/431.02; 364/551.01; 73/116; 60/39.29
[58] Field of Search .................. 364/431.02, 427, 551; 73/116; 60/39.29

[56] References Cited

U.S. PATENT DOCUMENTS

| | | | |
|---|---|---|---|
| 4,060,979 | 12/1977 | Elsaesser et al. | 60/39.29 |
| 4,159,625 | 7/1979 | Kerr | 364/431.02 |
| 4,215,412 | 7/1980 | Bermer et al. | 364/431.02 |
| 4,251,985 | 2/1981 | Sullivan | 60/39.29 |
| 4,578,756 | 3/1986 | Rosenbush et al. | 364/551 |
| 4,587,614 | 5/1986 | Couch | 364/431.02 |
| 4,594,849 | 6/1986 | Kenison et al. | 60/39.29 |
| 4,617,630 | 10/1986 | Zwicke et al. | 364/431.02 |
| 4,622,808 | 11/1986 | Kenison et al. | 60/39.29 |
| 4,655,034 | 4/1987 | Kenison et al. | 60/39.29 |
| 4,702,070 | 10/1987 | Cureton et al. | 60/39.29 |

FOREIGN PATENT DOCUMENTS

| 0633590 | 12/1961 | Canada | 60/39.29 |
|---|---|---|---|
| 0045732 | 3/1985 | Japan | 60/39.29 |

Primary Examiner—Parshotam S. Lall
Assistant Examiner—V. N. Trans
Attorney, Agent, or Firm—McCormick, Paulding & Huber

[57] ABSTRACT

A novel diagnostic system used in conjunction with an engine electronic control automatically determines start bleed strap failure in a gas turbine engine. The system indirectly determines engine start bleed strap failure without a separate sensor. A normal turbine temperature to engine inlet temperature ratio and burner pressure to engine inlet pressure ratio relationship is established. A failed engine start bleed strap corresponds to a high turbine temperature to engine inlet temperature ratio at a given burner pressure to engine inlet pressure ratio.

9 Claims, 5 Drawing Sheets

DIAGNOSTIC SYSTEM FOR DETERMINING ENGINE START BLEED STRAP FAILURE

This is a continuation of copending application Ser. No. 135,022 filed on Dec. 18, 1987 now abandoned.

This invention relates to gas turbine engine diagnostic systems and more particularly to those systems for determining failure of the engine start bleed strap.

BACKGROUND OF THE INVENTION

It is well known that many gas turbine engines employ a bleed strap which is opened as the engine is started. Essentially, a bleed strap is a mechanism which, when open, allows a portion of the compressed air from the compressor to bypass the turbine. As a result, the engine compressor operates in such a manner that its stall margin is increased. Safe and proper operation of the engine requires the bleed strap be closed near the end of the start sequence as the engine is approaching idle operation. Most jet engines automatically provide for bleed strap operation. However, few engine controllers have any provision for directly determining the status of the bleed strap.

Consequently, the aircraft pilot must perform an indirect check for bleed strap failure (open bleed strap) prior to take off. Traditionally, once the engine has started, and achieves normal idle operating conditions, the pilot throttles the engine to intermediate power and simultaneously checks the position of the exhaust gas nozzle. If the nozzle exceeds a threshold value (e.g. approximately 30% of maximum opening), it indicates to the pilot that the bleed strap has failed in an open position and requires maintenance.

However, newer digital electronic engine controls (DEEC) have control systems which compensate for bleed strap failure by increasing fuel flow to maintain engine schedules. This method of control prevents detection of a start bleed strap failure by simply monitoring the engine exhaust nozzle area.

It would be advantageous to have a gas turbine engine diagnostic system which would detect an engine start bleed strap failure from measured engine parameters independent of the exhaust nozzle area. The present invention provides such a system.

SUMMARY OF THE INVENTION

An object of the present invention is to provide a diagnostic system for use with a gas turbine engine electronic control which determines from measured engine parameters if a start bleed strap failure has occurred.

Another object of the present invention is to provide a start bleed strap diagnostic system for a gas turbine engine which will halt execution of diagnostic routines if prerequisite sensed parameters have been determined to be in error, that is, not present or having a value out of the normal operating range. Also, execution is halted if another failure in the engine system has been detected that effects the start bleed diagnostic system.

An object of the present invention is to provide for a diagnostic system for use with a gas turbine engine electronic control which automatically detects a failure of the engine start bleed strap.

Still another object of the present invention is to provide for a diagnostic system for use with a gas turbine engine electronic control which determines an engine start bleed strap failure without an additional sensor that directly indicates the bleed strap position.

According to the present invention, an engine start bleed strap diagnostic system which is used with an engine electronic controller in a gas turbine engine includes a means for receiving from a plurality of sensor signals indicative of corresponding engine parameters and a computer which receives these signals and automatically provides an indication of a failed engine start bleed strap in accordance with a diagnostic algorithm.

DESCRIPTION OF PREFERRED EMBODIMENT

Figure 1:
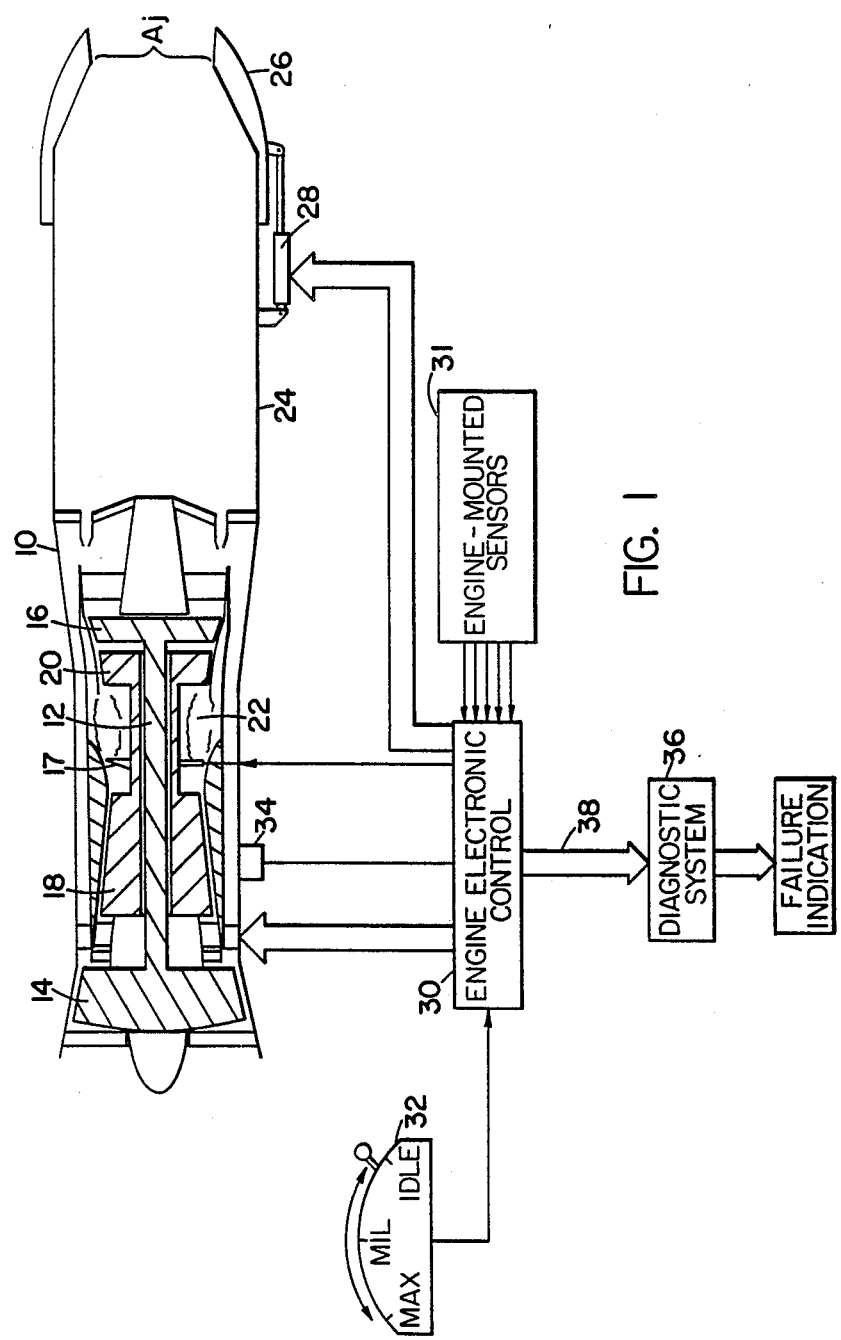
FIG. 1 is a simplified diagrammatic illustration of an electronic engine control employing a diagnostic system provided according to the present invention.

Referring now to FIG. 1, there is illustrated in simplified schematic form, a jet engine 10 which is of a conventional twin spool type having a first spool 12 including a fan 14 driven by a low pressure turbine 16 and a second spool 17 having a high pressure compressor 18 driven by a high pressure turbine 20. A burner 22 of a conventional type is located between the compressor exit and turbine inlet and serves to heat the gaseous engine working medium in order to power the turbines and generate thrust. The high pressure spool and low pressure spool are not mechanically interconnected, but rotate independently. The engine also includes an augmentor 24 receiving discharged gas from the low turbine. The gas exits the engine via an exhaust nozzle 26. As is conventional, an actuator 28 is used to control the position of the exhaust nozzle and thereby vary the area of the nozzle opening.

Also illustrated schematically at 30 in FIG. 1 is an engine electronic control (EEC) that receives signals from various components and sensors in the aircraft. The EEC 30 may be conventional, or preferably of a digital type (DEEC). There are several parameters received by the engine control which are indicated at 31, and include but are not limited to burner pressure, engine inlet total temperature, fan turbine inlet temperature, and engine inlet total pressure which are used both for control and diagnostic purposes. Other engine parameters are used by the control 30 to generate command signals to control burner fuel flow and the area of the exhaust nozzle in accordance with predetermined schedules selected to achieve optimum engine operation over the flight envelope.

The pilot controls engine power output using throttle lever 32. The angle of the throttle or power lever, as well as the rate of change of throttle lever angle, is determinative of the amount of power supplied by the engine. The control 30 determines the power lever angle and the rate of change of power lever angle in a conventional manner.

A bleed strap is shown schematically at 34 in FIG. 1. As indicated above, a bleed strap is an air valve mechanism which is positioned in the jet engine between compressor stages or at the compressor discharge such that when open, a selected amount of air is allowed to bypass the combustor by being diverted to the fan duct or "overboard" (i.e. vented externally). After the engine has reached near-idle operation, the control 30 closes the bleed strap. If, due to hardware or software failure, the bleed strap is not closed, the engine will operate at higher temperatures, use more fuel and may produce less power than it is designed to provide. In the past, a failed bleed strap (open) has been indirectly detected by measuring the exhaust nozzle area at intermediate power, a procedure which is precluded by newer control designs. With the present invention, a diagnostic system 36 is provided which receives signals on lines 38 from the EEC and, as defined hereinafter, determines automatically whether a bleed strap failure has occurred and provides an indication of the failed condition. Although illustrated in FIG. 1 as a separate system, the diagnostic system may be incorporated in an engine control which is also a digital electronic system.

The diagnostic system provided according to the present invention automatically determines whether a start bleed strap has failed and does so independent of the particular values that any given engine parameters may have. As described above, a gas turbine engine will run hotter and at less burner pressure than would normally be the case if the bleed strap had not failed. A diagnostic system provided by the present invention can give repeatable, consistent failure signals, as the present diagnostic system uses a relationship between engine temperature and pressure that makes a failed bleed strap easily identifiable. Other measurable parameters, such as rotor speeds, either have no correlation to bleed strap failure or they do not change in a manner that facilitates detection of a failure. The decrease in burner pressure with an increase in turbine temperature enhances detection by the present invention.

Figure 2:
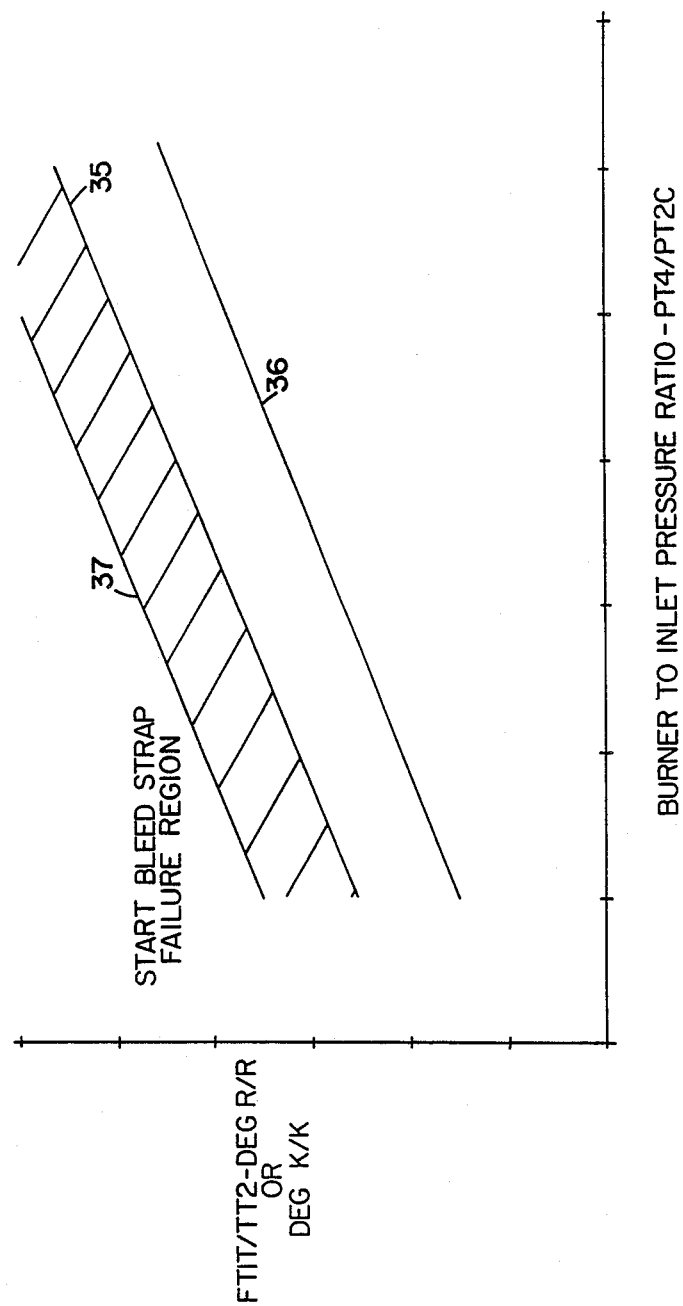
FIG. 2 is a diagram illustrating a computed engine parameter relationship used by the diagnostic system of FIG. 1.

In order to make the diagnostic system independent of the absolute magnitudes of the engine parameters, the relationship between temperature and pressure must be normalized. To do so, the diagnostic system of FIG. 1 computes the ratio of fan turbine inlet temperature (FTIT) to engine inlet total temperature (TT2) and relates that ratio to the computed ratio of burner pressure (PB) to engine inlet total pressure (PT2C). FIG. 2 plots such a relationship for the engine of FIG. 1.

A typical gas turbine engine will display a substantially linear relationship throughout the temperature ratio to pressure ratio range. Curve 35 corresponds to the computed temperature ratio to pressure ratio relationship. Parameter values between curve 36 and curve 35 indicate normal engine operation and show the bleed strap to be closed. However, values between curve 35 and curve 37 indicate a failed bleed strap.

For the diagnostic system of the present invention to provide a valid indication of start bleed strap failure signal errors for the following signals must not be present:
 turbine inlet temperature;
 engine inlet total temperature;
 total main combustor (burner) pressure;
 engine inlet static pressure;
 total mixing plane pressure;
 Mach number (speed). In addition, the following conditions must be met:
 failures in the nozzle system must not be present;
 failures in the anti-ice system must not be present;
 the anti-ice system must be off;
 the engine must be in primary control mode;
 the engine (aircraft) must be on the ground or in the take-off roll;
 the engine must stabilize at intermediate power for twenty seconds.

Figure 3:
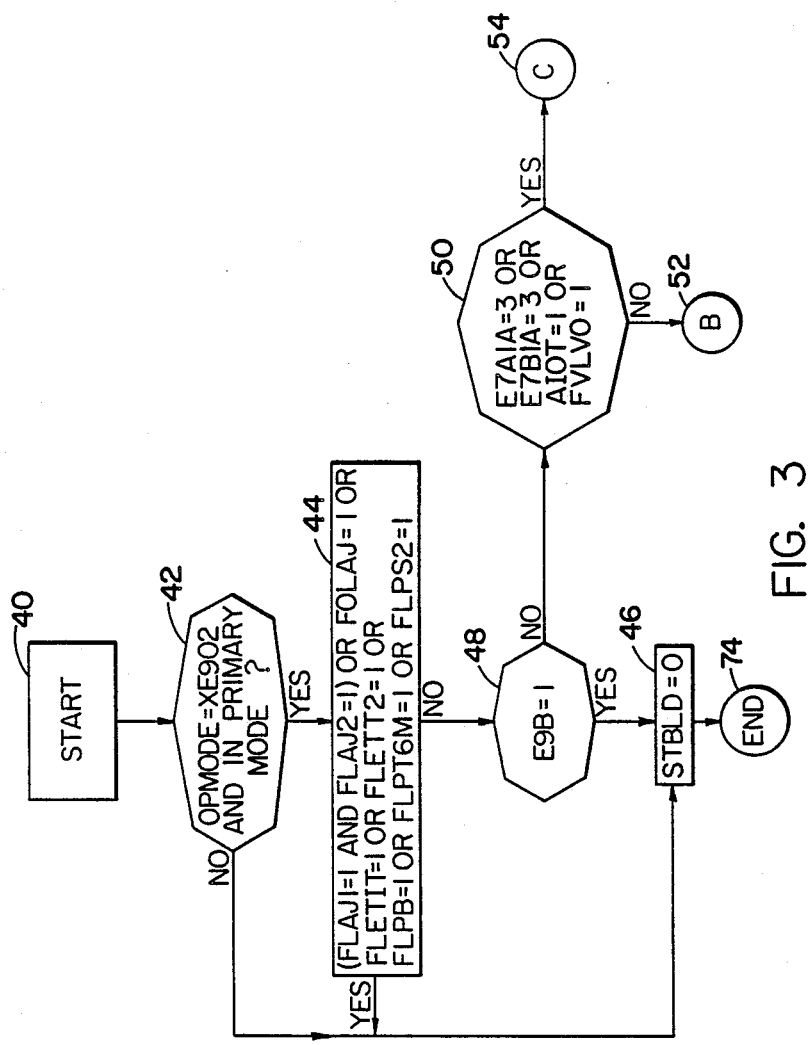
FIG. 3 is a schematic illustration of a first portion of an algorithm used by the diagnostic system of FIG. 1.

Referring now to FIG. 3, there is a diagrammatic illustration of an algorithm used by the diagnostic system 38 of FIG. 1. The following is a glossary of parameter definitions.

| | GLOSSARY OF TERMS |
|---|---|
| AIOT | Flag indicating an anti-ice over temperature. |
| DT | Time between diagnostic algorithm execution cycles. |
| E7AIA | Parameter indicating that the anti-ice system is on. |
| E7BIA | Parameter indicating that the anti-ice system is off. |
| E9A | Spike counter for temperature ratio limit exceedance. |
| E9B | Internal flag to bypass logic execution. |
| E9C | Spike counter for PLA at intermediate power. |
| EPR | Engine pressure ratio |
| FLAJ1 | Flag indicating failure of nozzle are resolver #1. |
| FLAJ2 | Flag indicating failure of nozzle area resolver #2. |
| FLETIT | Flag indicating failure of fan turbine inlet temperature signal. |
| FLETT2 | Flag indicating failure of inlet total temperature signal. |
| FLPB | Flag indicating failure of combustor pressure signal. |
| FLPS2 | Flag indicating failure of inlet static pressure signal. |
| FLPT6M | Flag indicating failure of mixing plane total pressure signal. |
| FOLAJ | Flag indicating open loop failure in the nozzle system. |
| FTIT | Fan turbine inlet temperature. |
| FTITT2 | FTIT/TT2 ratio. |
| FVLVO | Flag indicating failure of the anti-ice valve in the open position. |
| GND | Indicator of ground or air operation. |
| OPMODE | Indicator of engine operating condition. |
| PB | Burner pressure. |
| PBQPT2 | PT4/PT2C ratio. |
| PLA | Power lever angle. |
| PT2C | Total pressure at inlet, calculated from inlet static pressure. |
| PT4 | Combustor total pressure. |
| SBLIM | Temperature ratio limit. |
| TME901 | Timer for engine stabilization at intermediate power. |
| TT2 | Inlet total temperature. |
| SBFTT2 | FTIT/TT2 ratio stored to memory. |
| SBPBP2 | PT4/PT2C ratio stored to memory. |
| STBLD | Flag indicating failure of the start bleed strap. |
| XE902 | Program constant, Opmode value for engine operation at idle or higher power. |
| XE903 | Program constant, lower boundary on intermediate PLA. |
| XE904 | Program constant, upper boundary on intermediate PLA. |
| XE905 | Program constant, constant for use in calculation of temperature ratio limit. |
| XE906 | Program constant, constant for use in calculation of temperature ratio limit. |
| XE907 | Program constant, constant use for use in calculation of temperature ratio limit. |
| XE908 | Program constant, time limit for stabilization at intermediate power. |

At the initiation of the algorithm (block 40) the diagnostic system monitors signals from the electronic engine control to determine whether the engine power exceeds or is equal to idle power and that the engine is in primary control mode (block 42). If the engine is at idle power or greater and in primary control mode, the diagnostic system checks a plurality of engine sensor flags (block 44) to determine whether the exhaust nozzle area resolvers no. 1 and 2 have failed, whether the nozzle is operating in open loop, whether or not the engine temperatures are operative, and whether or not the engine pressure sensors are operative. If a failure of one of these sensors has occurred, the diagnostic system exits the loop without providing a signal indicating a bleed strap failure (block 46).

If the prerequisite engine parameters have not failed, the diagnostic system (block 48) determines whether it has previously set an internal flag to bypass start bleed strap diagnostic execution. If the flag has been set, the diagnostic system completes execution (block 46) without sending the bleed strap failure signal.

The diagnostic system subsequently interrogates (block 50) the engine anti-ice failure detection logic parameters to determine if the engine anti-ice system has failed open or is in operation. Depending upon these parameter values, the diagnostic unit will continue operation according to one of two alternative operational logic sequences (block 52 and block 54).

Figure 4:
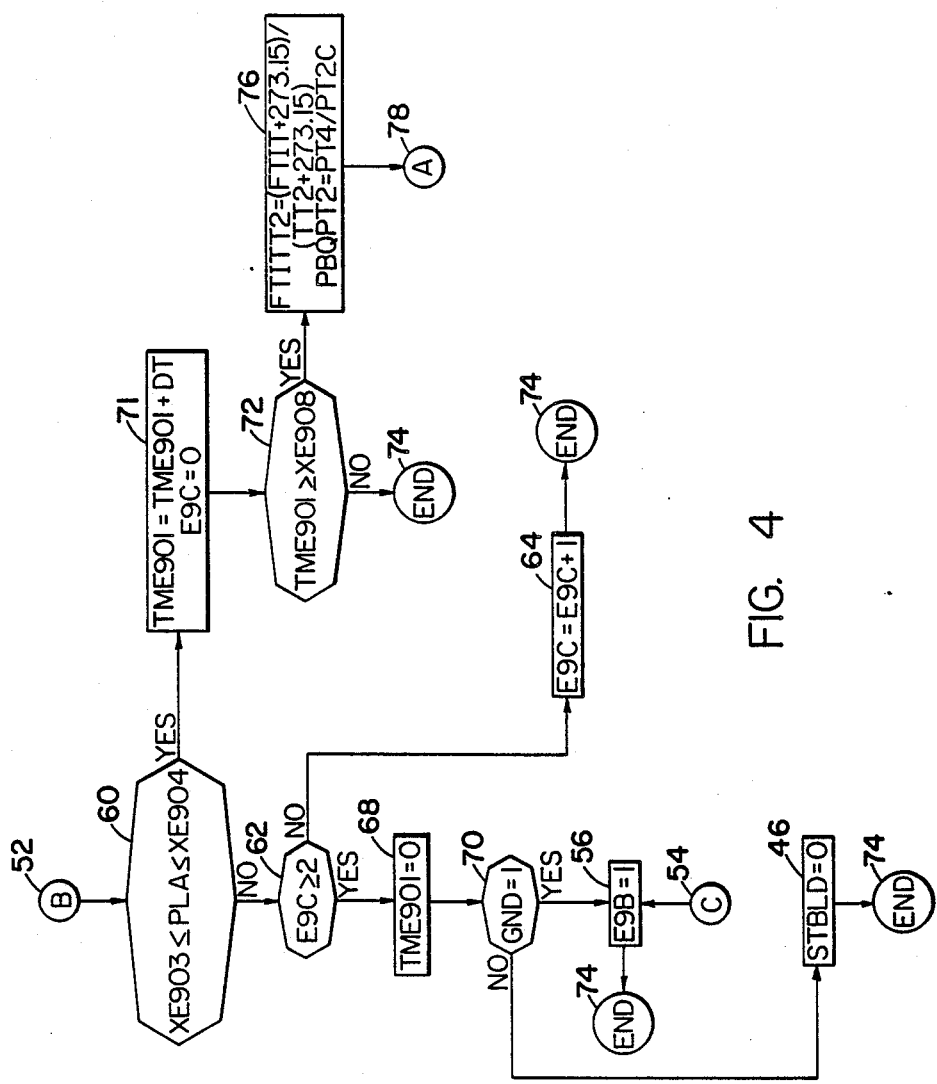
FIG. 4 is a diagram showing a second portion of the algorithm of FIG. 3.

FIG. 4 is a diagrammatic illustration of a second portion of the diagnostic algorithm of FIG. 3. If the diagnostic system has determined (block 54) a failed open or operational anti-ice system, the diagnostic system will set (block 56) an internal flag to bypass further execution of the algorithm and terminates execution (block 74).

Alternatively, the diagnostic system will proceed (block 52) and determine at block 60 whether the power lever angle is within intermediate power level bounds. Should the power lever angle be outside intermediate range, the diagnostic system interrogates a power level angle spike counter (block 62) to determine whether the power lever angle is truly out of the intermediate range or if noise in the power lever angle signal has caused it to be out of bounds. If the power lever angle spike counter has a value less than two, it is incremented (block 64) and the program is exited (block 74). If the power lever angle spike counter has a value of two or greater (which indicates operation outside of intermediate bounds), the intermediate stabilization timer is rest (block 68) and a determination of whether the aircraft is on the ground or in the air is made at block 70. Should the aircraft be in the air, an internal bypass flag is set (block 56) and the algorithm is exited (block 74). If the plane is still on the ground the system exits without setting a flag indicative of failed bleed strap (block 46).

Should the power lever angle be within intermediate bounds, the system at block 71 increments the timer by a prescribed amount (DT), and sets the power lever angle spike counter to 0. The diagnostic system checks the timer to see if time for stabilization has elapsed (block 72), if not, the diagnostic system operation is complete (block 74). However, if the timer for stabilization has elapsed, the diagnostic system computes the fan turbine inlet temperature to engine inlet temperature ratio (on an absolute temperature scale) and also the ratio of burner pressure to inlet pressure (block 76) and continues execution (block 78).

Figure 5:
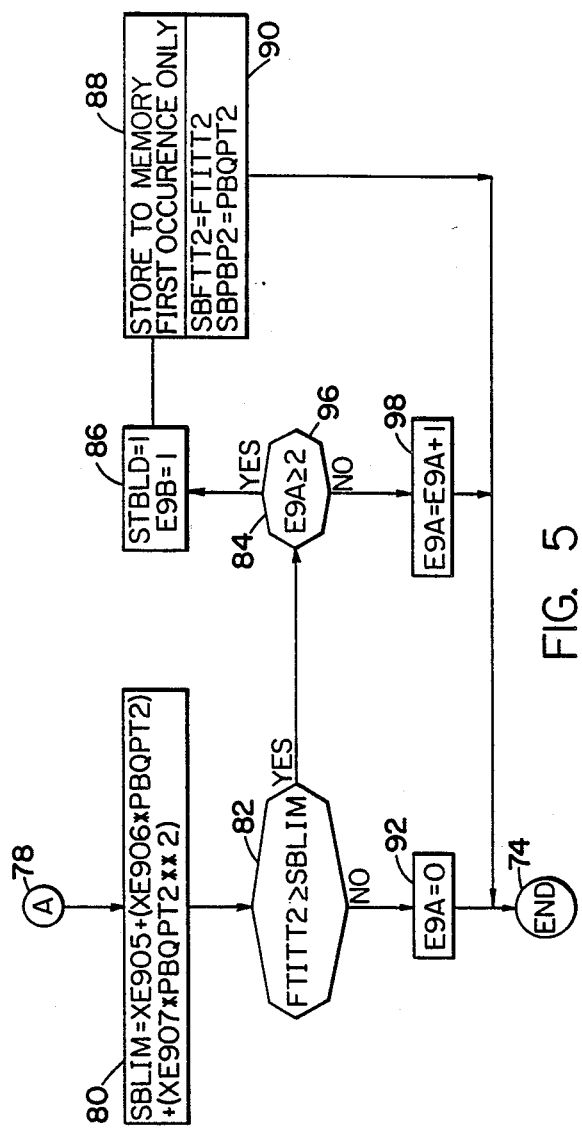
FIG. 5 is a diagram showing a third portion of the algorithm of FIG. 3.

Referring now to FIG. 5, there is a diagrammatic illustration of a third portion of the bleed strap failure diagnostic algorithm of FIG. 3. Once the system has computed diagnostic engine temperature and pressure ratios at block 78, the system determines the engine temperature ratio limit based on the current engine pressure ratio (block 80). If the engine temperature ratio is greater than the temperature ratio limit (block 82), the diagnostic system interrogates the temperature ratio exceedance limit spike counter (block 84). Should the value of the counter exceed two, the diagnostic system sets a flag (block 86) indicative of engine start bleed strap failure and also sets the internal bypass flag to bypass further diagnostic algorithm execution. First occurrence of the failure is stored in the diagnostic system memory (block 88), as is the corresponding engine temperature and pressure ratios (block 90) before the diagnostic system terminates operation (block 74).

However, should the temperature ratio be below the threshold value, the temperature ratio limit spike counter is set low (block 92), and the algorithm terminates execution (block 74). Should the spike counter for temperature ratio limit exceedance not be greater than two (block 96), the diagnostic system increments, at block 98, the counter before terminating operation.

Similarly, although the invention has been shown and described with respect to a preferred embodiment thereof, it would be understood by those skilled in the art that other various changes, omissions and additions thereto may be made without departing from the spirit and scope of the invention.

We claim:

1. In a gas turbine engine with operating conditions including a control mode and an engine operating power level having a band of intermediate power levels, the engine further having an engine start bleed strap, a diagnostic system for use with an engine electronic controller, said diagnostic system comprising:

a means for receiving signals indicative of a plurality of engine parameters including temperature of an engine turbine, engine inlet total temperature, pressure in an engine burner and engine inlet total pressure; and a computing means receiving said parameter signals and signals indicative of the engine operating conditions, said computing means for comparing said engine operating signals with preselected values thereof and, in dependence on said comparison, for computing a relationship between said engine temperatures and a relationship between said engine pressures, said computing means further for arithmetically determining a computed engine temperature - pressure relationship from said computed engine temperature relationship and said engine pressure relationship, comparing said computed engine temperature - pressure relationship with preselected values thereof and automatically providing signals indicative of a failed engine start bleed strap based on said comparison.

2. The diagnostic system of claim 1 wherein said computing means further includes a diagnostic algorithm and wherein said diagnostic algorithm terminates execution thereof if said received parameter signals indicate a sensor means failure.

3. The diagnostic system of claim 1 wherein said computing means further terminates said diagnostic algorithm without providing signals indicative of a failed start bleed strap if engine operating condition signals are received indicative of airborne operation of said engine.

4. The diagnostic system of claim 1 wherein said computing means provides bleed strap failure signals only if said diagnostic algorithm determines that said engine power level is at an intermediate level for a selected time period, that a parameter sensor failure has not occurred, and that an engine anti-ice system is not operating.

5. The diagnostic system of claim 1 wherein said computing means normalizes said relationship amongst said parameter signals by relating a ratio of engine turbine temperature to engine inlet total temperature and ratio of engine burner pressure to engine inlet total pressure.

6. In a gas turbine engine with operating conditions including a control mode and an engine operating power level having a band of intermediate power levels, the engine further having high and low pressure spools, a burner, an exhaust gas nozzle having a variable cross sectional area, and an engine start bleed strap, a diagnostic system for use with an engine electronic controller, said diagnostic system comprising:
   a means for receiving signals indicative of a plurality of engine parameters including temperature of an engine turbine, engine inlet total temperature, pressure in an engine burner and engine inlet total pressure; and
   a computing means receiving said parameter signals and signals indicative of said engine operating conditions, said computing means for comparing said engine operating signals with preselected values thereof and in dependence on said comparison, for computing a relationship between said engine temperatures and said engine pressures, said computing means further for arithmetically determining a computing engine temperature - pressure relationship from said computed engine temperature relationship and said engine pressure relationship, comparing said computed engine temperature - pressure relationship with preselected values thereof and automatically providing signals indicative of a failed engine start bleed strap based on said comparison and independent of the area of the exhaust gas nozzle.

7. The diagnostic system of claim 6 wherein said computing means further includes means for determining said engine is at idle power or greater and that the engine power level is in a primary control mode.

8. The diagnostic system of claim 6 wherein said computing means includes means for determining if the engine power level is stabilized within said intermediate power level band.

9. A method for diagnosing engine start bleed strap failure in a gas turbine engine having high and low pressure spools, burner and exhaust gas nozzle, comprising the steps of:
   receiving signals from a plurality of sensors indicative of a corresponding plurality of engine parameters, including engine turbine temperature, engine inlet total temperature, engine burner pressure and engine total pressure;
   determining engine operating power level including if the engine is operating within an intermediate power level band;
   determining if the engine is in a primary control mode;
   determining if said engine power level is stabilized within said intermediate power level band;
   terminating the diagnostic method if said received parameter signals indicate a failure of one of said sensors;
   terminating the diagnostic method if signals are received indicative of airborne operation of said engine;
   terminating the diagnostic method if signals are received indicative of operation of anti-ice system; and
   generation signals independent of the absolute magnitude of said received parameter signals including the steps of generating a ratio value of the engine turbine temperature to the engine inlet total temperature and a ratio value of the engine burner pressure to the engine inlet total pressure only if the engine is in said primary control mode and if said engine power level is stabilized within said intermediate power level band;
   providing signals indicative of engine start bleed strap failure should said engine temperature ratio value exceed a preselected temperature ratio value determined in dependence on an engine pressure ratio value.

* * * * *